US008596390B2

(12) United States Patent
Soliman et al.

(10) Patent No.: US 8,596,390 B2
(45) Date of Patent: Dec. 3, 2013

(54) TORQUE CONTROL FOR HYBRID ELECTRIC VEHICLE SPEED CONTROL OPERATION

(75) Inventors: Ihab S. Soliman, Warren, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 11/950,756

(22) Filed: Dec. 5, 2007

(65) Prior Publication Data

US 2009/0145673 A1    Jun. 11, 2009

(51) Int. Cl.
*B60K 6/20*      (2007.10)
*B60W 20/00*     (2006.01)

(52) U.S. Cl.
USPC .................................. 180/65.21; 180/65.285

(58) Field of Classification Search
USPC ........ 180/65.2, 65.21, 65.22, 65.225, 65.245, 180/65.28, 65.285, 65.29; 903/947
See application file for complete search history.

(56) References Cited

U.S. PATENT DOCUMENTS

| | | | |
|---|---|---|---|
| 5,988,307 A * | 11/1999 | Yamada et al. | 180/243 |
| 6,334,498 B1 * | 1/2002 | Morisawa et al. | 180/65.25 |
| 6,512,967 B2 | 1/2003 | Ostberg et al. | |
| 6,549,840 B1 * | 4/2003 | Mikami et al. | 701/69 |
| 6,617,703 B2 | 9/2003 | Matsubara et al. | |
| 6,636,788 B2 * | 10/2003 | Tamagawa et al. | 701/22 |
| 6,775,601 B2 | 8/2004 | MacBain | |
| 6,827,167 B2 | 12/2004 | Cikanek et al. | |
| 6,835,160 B2 | 12/2004 | Kitano et al. | |
| 6,837,323 B2 | 1/2005 | Denton et al. | |
| 6,853,893 B2 | 2/2005 | Corcione et al. | |
| 6,862,511 B1 | 3/2005 | Phillips et al. | |
| 6,890,283 B2 | 5/2005 | Aoki | |
| 6,907,337 B2 | 6/2005 | Phillips et al. | |
| 6,915,198 B2 | 7/2005 | Phillips et al. | |
| 6,988,779 B2 * | 1/2006 | Amanuma et al. | 303/152 |
| 6,988,976 B2 | 1/2006 | Potter | |
| 6,991,053 B2 | 1/2006 | Kuang et al. | |
| 6,994,360 B2 | 2/2006 | Kuang et al. | |
| 7,071,642 B2 | 7/2006 | Wilton et al. | |
| 7,131,708 B2 | 11/2006 | Tao et al. | |

(Continued)

FOREIGN PATENT DOCUMENTS

| EP | 1 707 428 A2 | 10/2006 |
|---|---|---|
| WO | 2006080570 A1 | 8/2006 |

OTHER PUBLICATIONS

U.S. Appl. No. 11/766,055, filed Jun. 20, 2007, Soliman et al.
U.S. Appl. No. 11/766,056, filed Jun. 20, 2007, Soliman et al.

(Continued)

*Primary Examiner* — J. Allen Shriver, II
*Assistant Examiner* — Chiedu Chibogu
(74) *Attorney, Agent, or Firm* — Julia Voutyras; Alleman Hall McCoy Russell & Tuttle LLP

(57) ABSTRACT

A method for operating a vehicle hybrid propulsion system is described. During a vehicle speed control operation where a speed of the vehicle is maintained at a desired speed, in response to acceleration resulting in vehicle speed beyond the desired speed, the acceleration not caused by vehicle operator input, the torque output of an upstream and/or downstream electric energy conversion device provides brake torque to a drive wheel to decelerate the vehicle to the desired speed. The selection of the electric energy conversion device may be based on an operating condition to achieve improved control and efficiency.

14 Claims, 7 Drawing Sheets

(56) References Cited

U.S. PATENT DOCUMENTS

| | | | |
|---|---|---|---|
| 7,151,987 | B2 | 12/2006 | Tobler et al. |
| 7,245,094 | B2 * | 7/2007 | Shinmura et al. ............. 318/139 |
| 2001/0013701 | A1 * | 8/2001 | Onoyama et al. ........... 290/40 C |
| 2002/0007974 | A1 * | 1/2002 | Nagano et al. ............... 180/65.2 |
| 2003/0205422 | A1 | 11/2003 | Morrow et al. |
| 2004/0034460 | A1 | 2/2004 | Folkerts et al. |
| 2004/0065490 | A1 * | 4/2004 | Saito et al. .................. 180/65.1 |
| 2004/0129470 | A1 | 7/2004 | Huelser et al. |
| 2005/0003928 | A1 | 1/2005 | Niki et al. |
| 2005/0060079 | A1 | 3/2005 | Phillips et al. |
| 2005/0079942 | A1 * | 4/2005 | Bauknecht et al. ............... 475/5 |
| 2005/0228553 | A1 | 10/2005 | Tryon |
| 2006/0048982 | A1 * | 3/2006 | Yamamoto et al. .......... 180/65.2 |
| 2006/0064225 | A1 | 3/2006 | Tabata et al. |
| 2006/0070779 | A1 | 4/2006 | Kuang et al. |
| 2006/0137920 | A1 * | 6/2006 | Aoki et al. ................... 180/65.2 |

OTHER PUBLICATIONS

"Land Rover Reveals 'Land_E', Technology Concept for Cleaner Environment, Improved Fuel Economy." Mar. 16, 2006. <http://www.asiaprnews.com/automotive/land-rover-reveals-land-e-technology-concept-for-cleaner.html>.

ISA European Patent Office, Search Report of EP 08 17 0402, Mar. 4, 2011, 8 pages.

* cited by examiner

TORQUE CONTROL FOR HYBRID ELECTRIC VEHICLE SPEED CONTROL OPERATION

BACKGROUND AND SUMMARY

Vehicles may be configured with a hybrid propulsion system that utilizes at least two different sources of torque for propelling the vehicle. As one non-limiting example, a hybrid propulsion system for a vehicle may be configured as a hybrid electric vehicle (HEV), wherein one or more electric machines and an internal combustion engine may be selectively operated to provide the requested propulsive effort. Similarly, during deceleration of the vehicle, the electric machines and engine can be selectively operated to provide vehicle driveline braking in order to recapture kinetic energy of the vehicle. In particular, the electric machines can be used to absorb torque that may be converted into electric energy which may be stored in a battery in what may be referred to as regenerative braking. In this way, vehicle efficiency may be increased.

Furthermore, the operating efficiency of a vehicle may be increased by utilizing closed loop feedback control to maintain a set speed or speed profile of a vehicle by selectively providing acceleration and deceleration based on an operating vehicle speed range. In one approach, the speed of a vehicle traveling along a decline or negative gradient may be maintained by providing selective deceleration via the friction brakes of the vehicle and/or engine compression braking.

However, the inventors of the present disclosure have recognized a disadvantage with the above approaches. In particular, continuous use of the friction brake to maintain a desired speed during a vehicle descent may cause increase wear of the friction brakes resulting in a shortened lifespan. Furthermore, in order to utilize engine compression braking, a state of a fixed-gear ratio transmission may be shifted which may result in driveline disturbances due to abrupt changes in the engine compression brake torque when a transmission down shift occurs. Moreover, due to closed loop feedback control during the vehicle speed control, a state of the transmission may be shifted frequently which may be referred to as shift busyness which may result in reduced drivability of the vehicle.

In at least one approach described herein, at least some of the above issues may be addressed by a hybrid propulsion system for a vehicle including, a transmission device for transmitting torque to a first at least one drive wheel, a first electric energy conversion device coupled to an internal combustion engine and input of the transmission device, a second electric energy conversion device for transmitting torque to a second at least one drive wheel, and a control system, during a vehicle speed control operation where a speed of the vehicle is maintained at a desired speed, in response to acceleration resulting in vehicle speed beyond the desired speed, the acceleration not caused by vehicle operator input, the control system varying torque output of at least one of the first electric energy conversion device and the second electric energy conversion device to provide brake torque to at least one of the first drive wheels and at least one of the second drive wheels to decelerate the vehicle to the desired speed, selection of said one of the first and second electric energy conversion device based on an operating condition.

By selectively varying the brake torque of the electric energy conversion devices of the hybrid vehicle during vehicle speed control operation in order to decelerate the vehicle to a desired speed, driveline braking may be transmitted to the wheels without a transmission downshift or even delaying a downshift and without use of the friction brakes. In this way, energy recovery may be maximized and engine braking may be minimized, driveline disturbances may also be reduced resulting in improved vehicle drivability and the lifespan of the friction brake may be extended. Furthermore, by taking advantage of the regenerative braking capabilities of the electric energy conversion devices a state of charge of an energy storage device may be increased.

DETAILED DESCRIPTION

Figure 1:
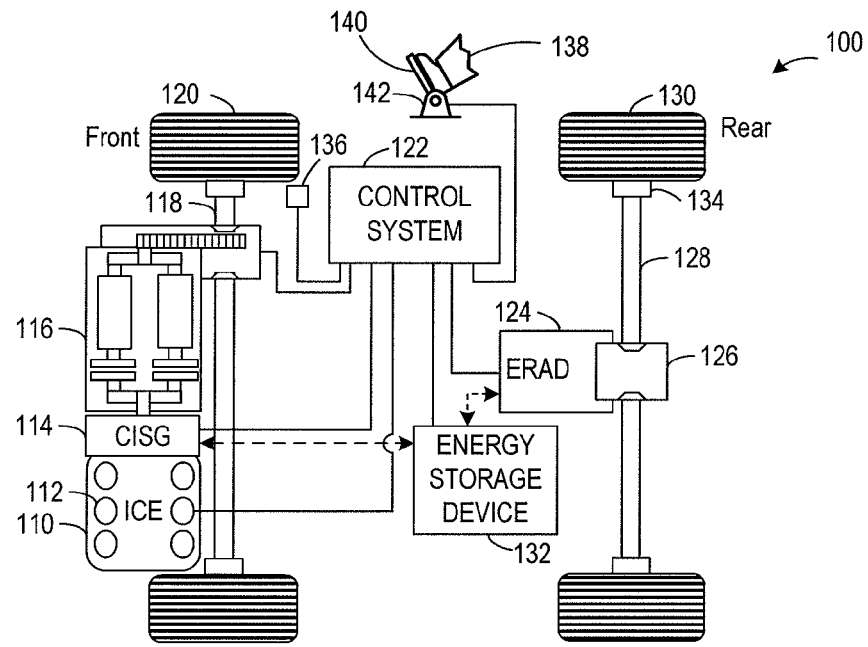
FIG. 1 shows an example hybrid vehicle propulsion system.

FIG. 1 illustrates an example hybrid propulsion system 100 for a vehicle. In this particular example, hybrid propulsion system 100 is configured as a hybrid electric vehicle (HEV), which may be operated in conjunction with a front wheel drive (FWD) vehicle platform. However, the approaches described herein may be applied to other vehicle platforms including rear wheel drive, four wheel drive, or all wheel drive systems. Hybrid propulsion system 100 includes a powertrain comprising an internal combustion engine (ICE) 110, a first electric energy conversion device 114, a transmission 116 for providing torque to front wheels 120, and a second electric energy conversion device 124 for providing torque to rear wheels 130.

The first and second electric energy conversion devices may be alternatively referred to as motors and/or generators. It will be appreciated that an electric energy conversion device may be any suitable device for converting electric energy to kinetic energy and/or kinetic energy to electric energy.

Engine 110 may include one or more combustion chambers or cylinders 112 for combusting a fuel. As one non-limiting example, engine 110 may be operated in what may be referred to as an Atkinson cycle. The engine may be operated in an Atkinson cycle to achieve improved fuel efficiency over similarly sized Otto cycle engines, whereby the electric motors may be operated to assist the engine to provide requested driveline torque, for example, during acceleration of the vehicle. However, in other examples, engine 110 may be operated in an Otto cycle or other suitable combustion cycle. It will be appreciated that during different modes of operation the engine may discontinue combustion of fuel in some or all of the cylinders. In this way, fuel efficiency may be increased. In some embodiments, engine 110 may be a diesel engine, such as for example an inline five cylinder diesel engine.

First motor 114 may be coupled to an output shaft of engine 110. In some embodiments, the first motor may be in operative communication with the engine via a gear configuration. As one non-limiting example, first motor 114 may be configured as what may be referred to as a crankshaft integrated starter/generator (CISG) system. During startup of the hybrid propulsion system, the CISG may provide torque to turn the engine to facilitate startup of the engine. Under some conditions, the CISG may supply torque output to supplement or replace engine torque. Further, under some conditions, the CISG may supply negative torque output that may be converted into electric energy.

Engine 110 and/or first motor 114 may transmit torque to an input of transmission 116. Transmission 116 may transmit torque to front wheels 120 via front axle (or final drive) 118. Transmission 130 may include two or more selectable gear ratios that can be used to vary the ratio of speed and/or torque that is exchanged between the transmission input (i.e. the engine/CISG) and the transmission output (i.e. final drive/front wheels). As one non-limiting example, transmission 116 may include six selectable gears, however, other transmissions having more or less gears may be used. Transmission 116 may also be configured as a continuously variable transmission (CVT). Further, transmission 116 may be configured as a dual-clutch (i.e. powershift) or automatically shifted manual transmission or any converter-less automatic transmission all of which do not use a torque converter. In alternative embodiments, transmission 116 may include a torque converter comprising an impeller and a turbine. The transmission may be engaged or disengaged by varying a state of the torque converter to vary the torque transfer between the impeller and the turbine.

It will be appreciated that first motor 114 may be configured in a motor system that includes any suitable gearing to enable first motor 114 to be selectively operated independent from engine 110. For example a clutch may be used to provide an operative disconnect in between the CISG system and the engine to reduce frictional torque losses from the engine while the CISG system is used to generate electrical energy.

Continuing with FIG. 1, second electric energy conversion device 124 may be communication in communication with rear axle 128 and rear wheels 130 via gear configuration (or final drive) 126. In some embodiments, second electric energy conversion device (or motor) 124 may be configured as what may be referred to as an electric rear axle device (ERAD) system. The ERAD system may include any suitable gearing to enable the second motor to provide torque output to the rear wheels. For example, gear configuration 126 may include a planetary gear set comprising a carrier (C), a sun gear (S), and a ring gear (R). By varying a state of the planetary gear set, an amount of torque exchanged between second motor 124 and final shaft 128 may be varied. In this way, second motor 124 may selectively supply or absorb torque to drive shaft 128 and rear wheels 130. In alternative embodiments, second motor 124 may be coupled directly to final drive 128.

CISG system 114 and ERAD system 124 may be operated to exchange torque with drive shafts 118 and 128, respectively. For example, CISG system 114 can be operated to supply torque to drive shaft 118 in response to electrical energy received from energy storage device 132. Similarly, ERAD system 124 can be operated to supply torque to drive shaft 128 in response to electrical energy received from energy storage device 132. In this manner, the CISG and/or ERAD can be operated to assist the engine to propel the vehicle or to propel the vehicle without operation of the engine.

Furthermore, CISG system 114 and/or ERAD system 124 can be selectively operated to absorb torque from drive shafts 118 and 128, respectively, whereby the energy may be stored at energy storage device 132 or exchanged between CISG system 114 and ERAD system 124. For example, electrical energy generated by the ERAD can be supplied to the CISG to rotate engine 110 as means of dissipating energy. Further, in one example, valve timing of the engine may be adjusted to increase pumping losses to change affect the rate of energy dissipation from the energy storage device. As another example, where the CISG is connect to the engine output shaft via a gear configuration the reduction ratio of the gear configuration may be adjusted to change the rate of energy dissipation. During an energy dissipation operation, under some conditions, the CISG/engine may be disengaged from the transmission such that no torque is transmitted to the wheels. Energy storage system 132 may include one or more batteries, capacitors, or other suitable energy storage devices. It will be appreciated that each of front wheel 120 and rear wheels 130 may include one or more friction brakes 134 to provide supplemental braking for deceleration of the vehicle.

A control system 122 may be communicatively coupled to some or all of the various components of hybrid propulsions system 100. For example, control system 122 can receive operating condition information from engine 110 such as engine speed, CISG system 114, transmission 116 including the current gear selected, transmission turbine and drive shaft speeds, torque converter state, ERAD 124, energy storage device 132 including state of charge (SOC) and charge rate, wheels 120 and 130 including vehicle speed, and the position of the friction brakes.

In some embodiments the control system may receive vehicle operator input via a vehicle operator input device. For example, the control system may receive a vehicle braking request 138 from a vehicle operator via a pedal 140 as detected by pedal position or pressure sensor 142. Moreover, the control system may receive a vehicle and/or engine braking request from a user such as low range selection via the shift selector. In some embodiments, the control system may identify the angle of inclination or grade of the road surface via an inclinometer or other suitable device. In particular, sensor 136 may be in communication with control system 122 and may provide measurements of various vehicle operating conditions. For example, sensor 136 may be a speed sensor to detect the speed of one or more wheels of the vehicle. Further, the hybrid vehicle propulsion system may include a sensor to monitor the speed of each wheel of the vehicle. In some embodiments, the sensor may be an accelerometer which may provide an indication of acceleration of the wheels or instead may be used to measure a grade, or more particularly an include of a road surface. In one example, sensor 136 may be utilized with other suitable sensors to determine a deceleration condition of the vehicle. Further, sensor 136 may be utilized with other suitable sensors to determine other vehicle operating conditions.

Further, control system 122 can send control signals to engine 110 to control fuel delivery amount and timing, spark timing, valve timing, throttle position, among other engine operating parameters, CISG 114 to control the amount of torque exchanged with transmission 116 and/or engine 110, transmission 116 to change gear selection and to control the state of the torque converter or clutch(s), ERAD 124 to control the amount of torque exchanged with driveshaft 128, energy storage device 132 to control the amount of energy received from or supplied to the ERAD and CISG systems, and the friction brakes to vary an amount of braking force applied at the wheels 120 and 130 as will be described in greater detail herein. It will be appreciated by one of skill in the art in light of the present disclosure that the control system may adjust operating parameters of the various driveline components via electromechanical or electro-hydraulic actuators, or other suitable device.

Control system 122 may include one or more microcomputers, including a microprocessor unit, input/output ports, an electronic storage medium for executable programs and calibration values configured as read only memory chip, random access memory, and/or keep alive memory, and a data bus. Thus, it will be appreciated that control system 122 can execute the various control routines described herein in order to control the operation of hybrid propulsion system 100. In one example, to achieve optimum negative driveline torque control during a braking operation, the control system may be configured to increase and/or maximize energy recovery while reducing and/or minimizing engine braking by utilizing the regenerative braking capability of the electric machines within the energy storage capacity and power exchange limitations of the energy storage device.

In some embodiments, controls system 122 may include a plurality of control modules and each of the control modules may control a subsystem of the vehicle. For example, control system 122 may include an engine control module (ECM) to control engine operation, a transmission control module (TCM) to control transmission operation, and an integrated system controller (ISC) to control operation of the electric energy conversion and storage devices.

Figure 2:
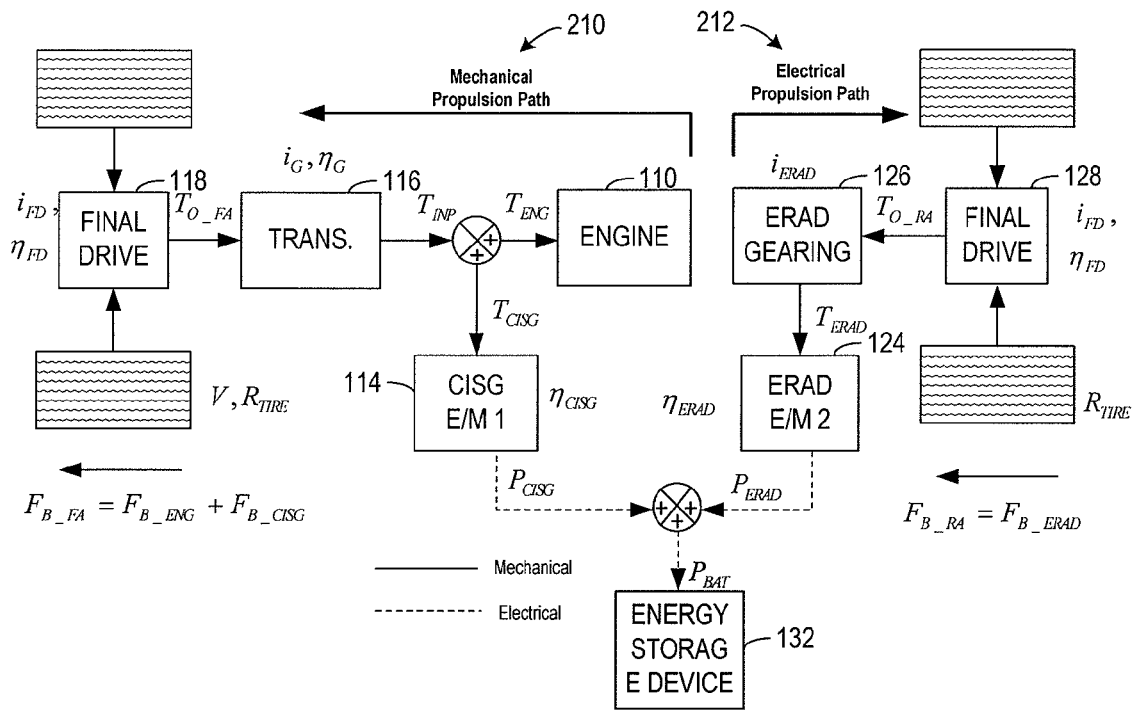
FIG. 2 shows an energy flow diagram of the propulsion system of FIG. 1.

FIG. 2 shows an example energy flow diagram corresponding to the hybrid propulsion system of FIG. 1. The energy flow diagram includes mechanical propulsion path 210 and electrical propulsion path 212. Mechanical propulsion path 210 may provide vehicle propulsion to front axle (or final drive) 118 and front wheels 120. In particular, engine 110 and/or CISG 114 may generate torque output that may be transmitted through transmission 116 to provide torque to front wheel 120 to propel vehicle (or propulsion system) 100. Further, during a deceleration condition, engine 110 and/or CISG 114 may be operated to generate negative torque transmitted through transmission 116 to front wheels 120 to provide engine braking capabilities to decelerate vehicle 100. In one example, during a deceleration condition, the control system may advantageously provide additional brake torque through the mechanical propulsion path by operating the CISG to maximize negative torque output within the operating limits of the CISG to generate electric energy that may be stored in the energy storage device to increase state of charge of the energy device which may be referred to as regenerative braking.

It will be appreciated that under some conditions, only the CISG may be operated to provide brake torque to decelerate the vehicle. In some cases, one or more cylinders of the engine may be deactivated during a deceleration condition. In this way, fuel economy performance of the engine may be improved. Further, under some conditions fuel and spark may be stopped in one or more cylinders of the engine and/or valve timing of the engine may be adjusted. In this way, pumping losses may be increased which may advantageously increase engine braking capabilities of the mechanical propulsion path.

Electrical propulsion path 212 may provide vehicle propulsion by providing torque directly to the rear axle (or final drive) 128 and rear wheels 130. In particular, ERAD 124 may generate torque output that may be transferred through ERAD gearing 126 and rear axle 128 to rear wheels 130 to propel vehicle 100. Further during a deceleration condition, ERAD 124 may be operated to generate negative torque transmitted through ERAD gearing 126 to rear wheels 130 to provide braking capabilities to decelerate vehicle 100. By controlling ERAD 124 to provide negative brake torque to rear wheels 130, electric energy may be generated that may be stored in the energy storage device so that the state of charge of the energy storage device may be increased.

Under some conditions, the CISG and the ERAD may be operated cooperatively to provide brake torque to the front wheels and the rear wheels, respectively without operation of the engine in order to maximize regeneration of the energy storage device. Further, under some condition the engine and the ERAD may be operated cooperatively to provide brake torque to the front wheels and the rear wheels, respectively. It will be appreciated that the transmission and/or the ERAD gearing may be controlled to meet requested brake torque demands. Control strategies for providing brake torque to decelerate the vehicle will be discussed in further detail below with reference to FIGS. 4-7.

During vehicle operation, the control system may direct torque output through the mechanical propulsion path 210 and/or electrical propulsion path 212 to operate vehicle 100 in different operating modes. For example, the control system may operate the vehicle in what may be referred to as electric drive in which only the ERAD may be controlled to provide motoring/generating capabilities (i.e. positive torque output and negative torque output, respectively).

As another example, the control system may operate the vehicle in what may be referred to as series hybrid drive in which the engine may be combusting air and fuel, the CISG may be operated to provide generating capabilities (e.g. negative torque, such as to increase the state of charge of the energy storage device), and the ERAD may be operated to provide motoring/generating capabilities depending on operating conditions.

As yet another example, the control system may operate the vehicle in what may be referred to as engine drive in which the engine is combusting fuel and spark, transmission is transmitting torque (i.e. engaged or slipping), and both the CISG and the ERAD are shut down. This mode of operation may be similar to operation of a non-hybrid vehicle that does not include electric energy conversion devices.

As yet another example, the control system may operate the vehicle in what may be referred to as parallel hybrid drive in which the engine is combusting air and fuel and the CISG and/or the ERAD are operational. Under some conditions, in parallel hybrid drive, the CISG may be shutdown and the ERAD may provide motoring/generating capabilities. Under some conditions, in parallel hybrid drive, the CISG may be providing motoring capabilities and the ERAD may be shut down. Under some conditions, in parallel hybrid drive, the CISG and the ERAD may provide motoring capabilities. Under some conditions, in parallel hybrid drive, the CISG may provide generating capabilities and the ERAD may provide motoring/generating capabilities or may be shutdown.

As yet another example, the control system may operate the vehicle in what may be referred to as engine start mode in which the CISG may provide motoring capabilities to start the engine. In particular, the CISG may provide torque to the engine to facilitate engine cranking.

As yet another example, the control system may operate the vehicle in what may be referred to as engine stop mode in which engine cranking may be shut down.

It will be appreciated that the above engine operating modes are exemplary and other operating modes may be employed to control the vehicle during operation. In one example, a vehicle control strategy may include different operating modes that may be performed during vehicle speed control operations to provide smooth braking capabilities to maintain a desired speed. The control strategy may be implemented to account for acceleration that does not include vehicle operator commanded acceleration via a vehicle operator input device, such as an accelerator pedal. The control strategy may select a mode of operation while taking into account vehicle stability while maximizing energy recovery. The control strategy may coordinate the powertrain control utilizing an engine, electric machines and a multiple step fixed-gear or continuously variable ratio transmission device given a negative driveline torque (or braking force) request. Specifically, a state of the transmission and/or engine may be coordinated with the regenerative braking capability of the hybrid propulsion system as an enhanced means of decelerating the vehicle within the state of charge (SOC) and power exchange limits of the battery beyond the capabilities of other vehicles. By coordinating and controlling the powertrain the requested driveline braking force can be achieved while maximizing energy recovery during a deceleration condition to maintain a desired vehicle speed.

As one example, a deceleration condition may occur during automatic vehicle speed control operation, such as for example cruise control or vehicle speed control on a downhill grade which may be referred to as hill decent control. In particular, hill descent speed control or driveling braking speed control may include selective driveline braking to maintain a desired vehicle speed. In one example, driveline braking speed control may maintain a desired vehicle speed and in response to acceleration of the vehicle without driver input (e.g. a change in pedal position) driveline braking may be applied to decelerate the vehicle to the desired vehicle speed. Strategies for coordinating operation of the electric machines, engine, and transmission to provide driveline braking to maintain a desired vehicle speed will be discussed in further detail with reference to FIGS. 5-7.

As another example a deceleration condition may include a request to reduce vehicle speed to either lower the speed of the vehicle or to completely stop the vehicle. The request may be generated, for example by a closed brake pedal condition (driver demand), coast down, or other braking. As yet another example, a deceleration condition may include a request of driveline brake force to keep the vehicle from moving, for example, on an incline/decline where the vehicle may be on a grade or where vehicle may be at rest on level ground. During such a deceleration condition a driveline brake force may be applied to maintain the vehicle in the same position. In one example, driveline braking speed control may hold the vehicle at a speed of zero such as to hold the vehicle at rest on an incline/decline or at rest on a flat surface by monitoring a brake pedal position and an inclinometer position and in response to a change in brake pedal position a driveline braking force may be applied to hold the vehicle in place. The driveline brake force may be based on the level of incline as well as other suitable factors. Strategies for coordinating operation of the electric machines, engine, and transmission to provide driveline braking to maintain a vehicle position will be discussed in further detail with reference to FIGS. 5-7.

It will be appreciated that the vehicle braking requests may be directly requested by the driver through the use of the brake system or the driveline (e.g. low range selection-max engine braking or manual gear request). Furthermore, these requests may be automatically controlled and requested through unique vehicle modes or functions such as hill descent control or adaptive cruise control. In any of the above deceleration conditions, the driveline may be controlled to provide the desired braking force in order to maximize energy recovery and extend the life of the friction brakes.

Accordingly, an operating mode may be selected by the control system from a plurality of example operating modes shown in greater detail in FIGS. 4A-4F to achieve a brake torque request while maximizing energy recovery. As one example, the operating modes may be selected by the control system in response to stored values. The control system may also utilize adaptive learning to select a suitable operating mode based on previous driveline braking or downshift response.

Figure 3:
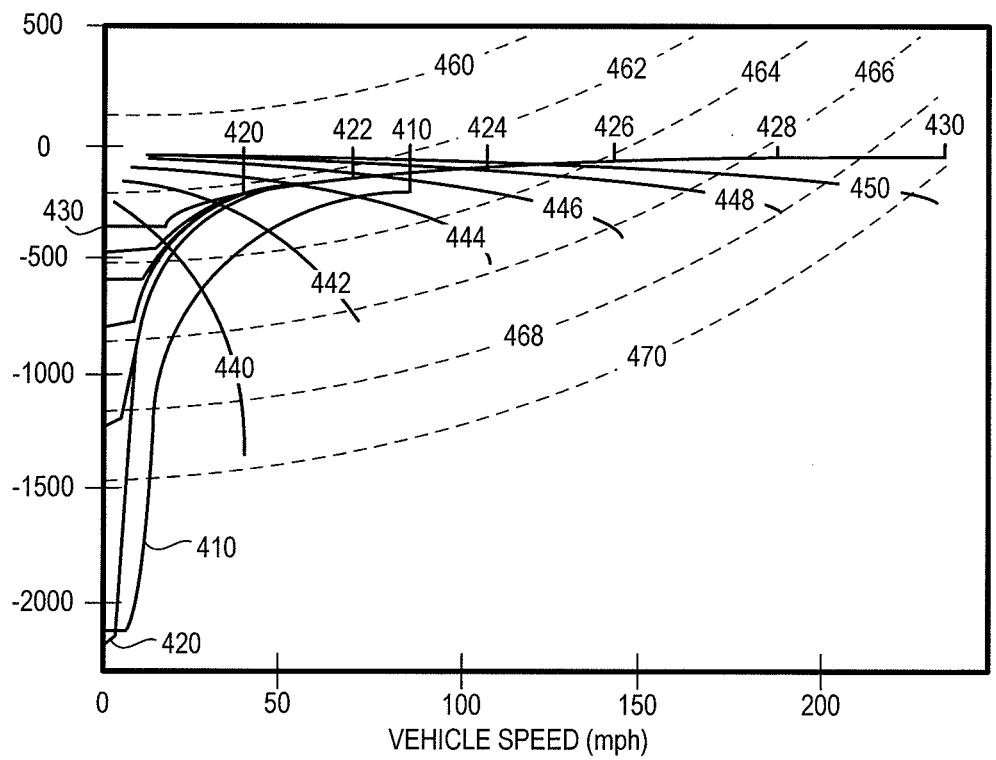
FIG. 3 is a graph illustrating maximum braking forces that may be achieved by the various components of an example hybrid propulsion system.

Note that the level of braking force provided by the CISG and the ERAD may be constrained by their respective limitations. Additionally, the energy storage capacity (e.g. battery state of charge (SOC)) and/or power exchange rate limitations of the energy storage device may further limit the level of braking force that may be provided by the CISG and ERAD. As one example, the driveline braking capabilities of both the CISG and ERAD may decrease with increasing vehicle speed as depicted by the graph of FIG. 3. Furthermore, the braking capabilities of the CISG and the engine may also vary as a function of the transmission state at a given vehicle speed since the engine speed will increase or decrease in response to transmission shifting.

FIG. 3 provides a graph depicting braking limitations of the ERAD, CISG, and engine with varying vehicle speeds and transmission states for hybrid propulsion system 100. In particular, an example of the maximum braking force that may be provided by the ERAD with varying vehicle speed is shown at 410. A range of maximum braking force that may be provided by the CISG is shown at 420-430 based on the particular transmission gear selected. For example, a maximum braking force that may be provided by the CISG when a first gear of the transmission is selected is shown at 420. Examples of the maximum braking force that may be provided by the CISG when one of a second, third, fourth, fifth, and sixth gear of the transmission is selected are shown at 422, 424, 426, 428, and 430, respectively. As depicted by the graph of FIG. 3, the maximum amount of braking force that may be provided by the CISG decreases with increasing vehicle speeds and is greater at lower gears than at higher gears.

FIG. 3 also shows a range of braking forces 440-450 that may be provided by the engine with varying vehicle speeds. For example, a maximum braking force that may be provided by the engine when a first gear of the transmission is selected is shown at 440. Examples of the maximum braking force that may be provided by the engine when one of a second, third, fourth, fifth, and sixth gear of the transmission is selected are shown at 442, 444, 446, 448, and 450, respectively. As depicted by the graph of FIG. 3, the amount of braking force that may be provided by the engine increases with increasing vehicle speeds and is greater at lower gears than at higher gears. Note that the selected transmission state (e.g. transmission gear and/or torque converter state) can take into account engine speed limits (e.g. lug and/or overspeed) in addition to friction element energy limitations at a given vehicle speed. Thus, the capabilities of the CISG and engine to provide driveline braking may be also constrained by the maximum and/or minimum allowable engine speeds.

FIG. 3 also depicts road load for varying road grades and changing vehicle speed. For example, a 0% grade is shown at 460, a −5% grade is shown at 462, a −10% grade is shown at 464, a −15% grade is shown at 466, a −20% grade is shown at 468, and a −25% grade is shown at 470. Note that a negative grade as described herein refers to a vehicle traveling down an inclined surface.

Thus, FIG. 3 illustrates example limitations of the engine, CISG, and ERAD of hybrid propulsion system 100 with varying vehicle speed and transmission state. Note that these limitations have been provided as an example and may vary with the particular driveline configuration and driveline actuators utilized by the control system. As shown in FIG. 3, during some conditions two or more of the engine, CISG and ERAD may be operated to provide the requested driveline braking force if the maximum braking force of any one of the driveline components is exceeded. Note that the friction brakes may also be used to reduce driveline braking in order to avoid limitations of the various driveline components. Thus, particular combinations of the engine, CISG, and ERAD, may be employed to provide braking torque to meet a desire brake force in a smooth manner. In particular, due to the quick torque output response of the electric energy conversion devices, brake torque may be varied by the electric energy devices to account for changes in transmission state or engine operation to provide brake torque to meet a desired brake demand during a deceleration condition. In this way, engine braking and vehicle coast down may be performed smoothly while reducing shift busyness.

The combinations of torque sources are defined herein below by different operating modes 1-6 which will be described in further detail with reference to FIG. 4. In particular, the operating modes may be specifically utilized to provide smoother wheel brake torque during vehicle braking to provide improved vehicle drivability while maximizing energy recovery. The operating modes may be employed with or without requiring operation of the friction brakes to provide a requested brake torque. In this way, the limitations on the amount of driveline braking force provided by each of the engine, CISG, and ERAD may be taken into account when selecting a particular operating mode so that the requested driveline braking force may be achieved in an efficient manner.

Figure 4A:
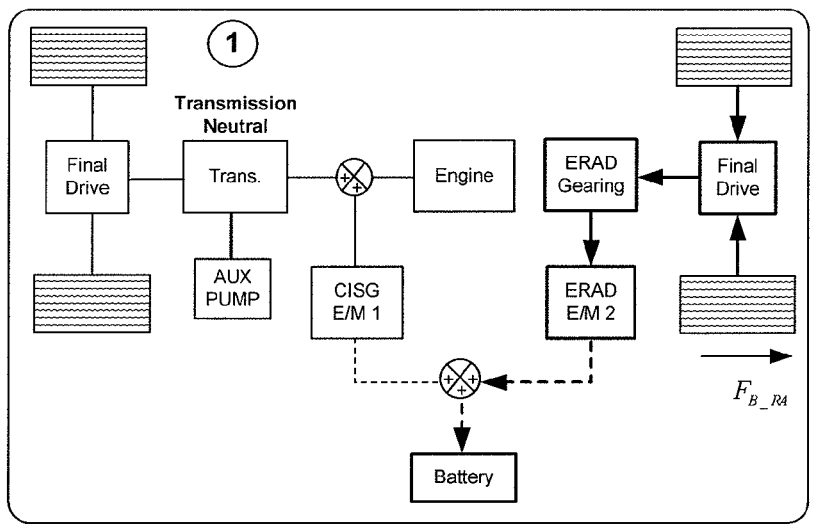
FIGS. 4A-4F show example operating modes of an example hybrid propulsion system and energy flow paths of the respective operating modes.
Figure 6:
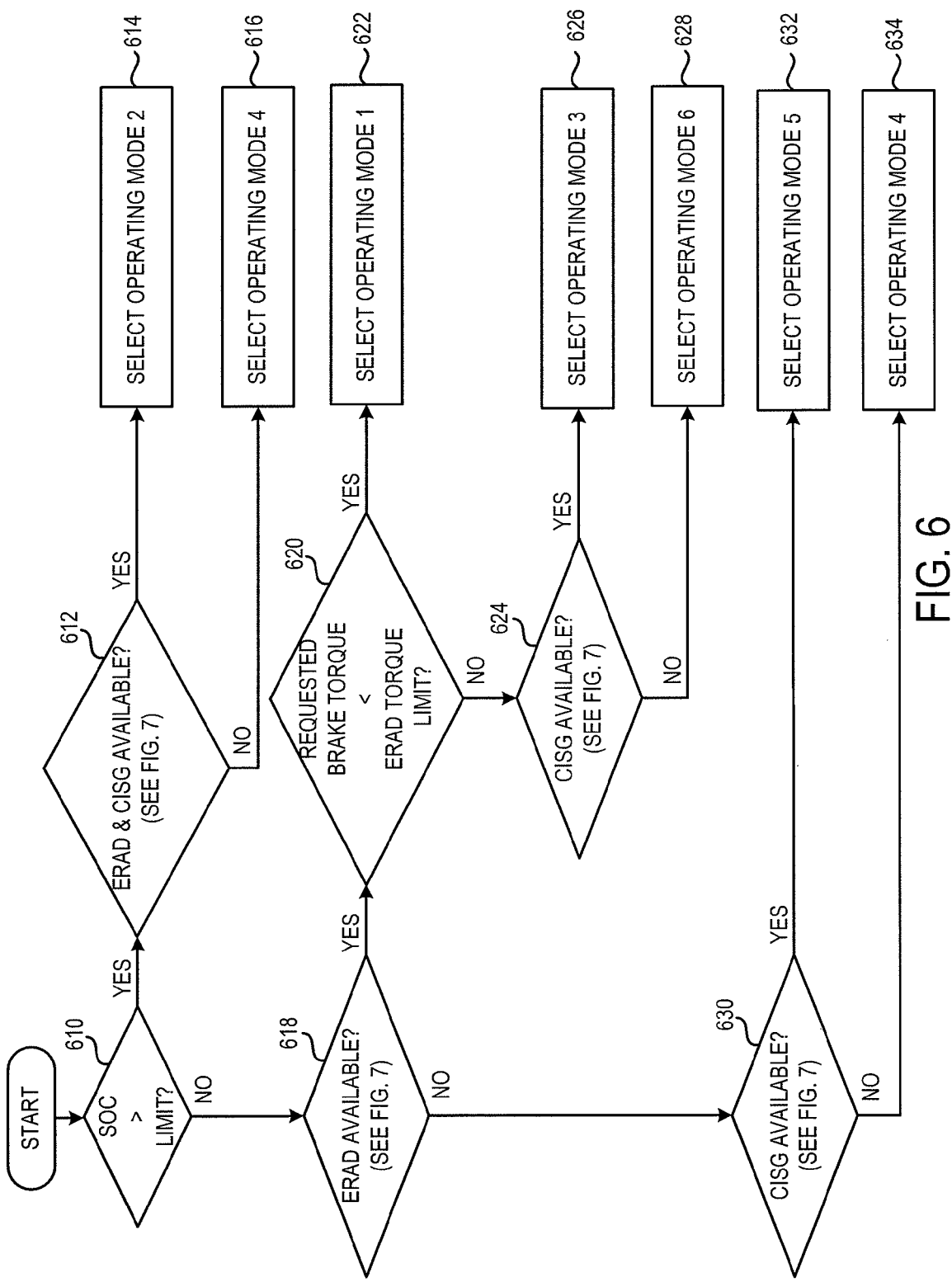
FIG. 6 shows a flowchart corresponding to a control routine for selecting an operating mode to control output torque during a vehicle speed control operation.

FIGS. 4A-4F show six different operating modes that may be performed to provide brake torque to the wheels during vehicle deceleration. The different operating modes may take into consideration operating conditions as well as operation limitations of the vehicle propulsion system components. Strategies for selecting an operating mode to provide brake torque to achieve a requested driveline braking force during a deceleration condition will be discussed in further detail below with reference to FIG. 6 FIG. 4A shows a schematic depiction of an energy flow path of an example hybrid propulsion system performing a first operating mode that may be performed during a deceleration condition to achieve the requested driveline braking force. The first operating mode includes use of the ERAD to achieve the requested driveline braking force. In the first operating mode, the ERAD may absorb torque and convert the brake force into electrical energy that may be stored in the energy storage device, as indicated by the bold lines and directional arrows. During the first mode, the transmission may be disengaged into a neutral state such that the front wheels are not affected by output of the engine and/or CISG. The first operating mode may advantageously provide brake torque in a direct manner during a deceleration condition because brake torque may be supplied to the wheels independent of a state of the engine and/or the transmission. Further, the first operating mode may be utilized when the CISG is unavailable or incapable of providing brake torque to meet a desired brake force.

Figure 4B:
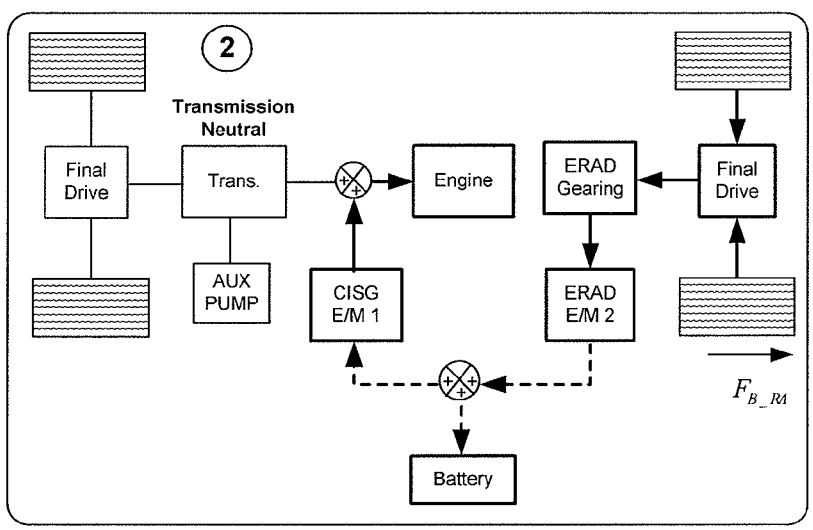

FIG. 4B shows a schematic depiction of an energy flow path of an example hybrid propulsion system performing a second operating mode that may be performed during a deceleration condition to achieve the requested driveline braking force. The second operating mode includes use of the ERAD to achieve the requested driveline braking force during conditions where a state of charge of the battery is high. In particular, the ERAD may absorb torque and convert the brake force into electrical energy that may be stored in the energy storage device and the CISG may generate torque output in order to utilize energy from the energy storage device such that the battery state of charge is not increased. Further, the transmission may be placed in a neutral state or disengaged from the CISG so that torque output of the CISG may not be transmitted to the wheels. In some cases, the engine may not be combusting fuel and air and the torque output of the CISG may be transmitted to the engine to spin the engine. In this way, excess energy captured during the deceleration condition can be dissipated through spinning the engine. Depending on the brake torque request and the operating limitations of the CISG and the ERAD, the operating efficiencies of the CISG and the ERAD may be advantageously adjusted to create a charge neutral state such that the state of charge of the battery is not increased during the deceleration condition.

In some embodiments, the gearing of the CISG and/or ERAD may be adjusted to change the output efficiency in order to create a charge neutral situation while meeting the request driveline brake force. In one example, the second mode may be selected during an extended downhill descent to provide driveline braking with minimal or no use of the friction brakes where during a first part of the descent the battery may be charged as a result of regenerative braking. By operating the CISG and the ERAD in cooperation as described above driveline braking may be provided for an extended period without use of the friction brakes. In this way, the life of the friction brakes may be extended.

Figure 4C:
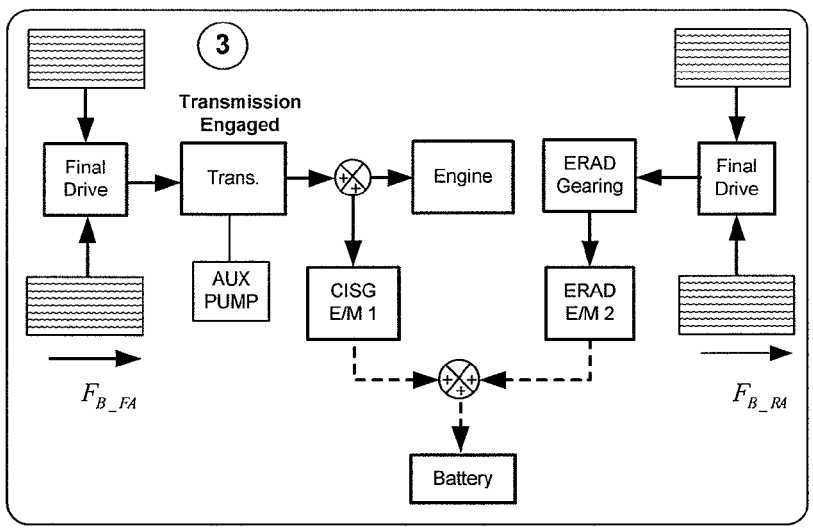

FIG. 4C shows a schematic depiction of an energy flow path of an example hybrid propulsion system performing a third operating mode that may be performed during a deceleration condition to achieve the requested driveline braking force. The third operating mode includes use of both the CISG and the ERAD as well as engine compression braking to achieve the requested braking force during the deceleration condition. In the third operating mode, both the CISG and the ERAD may absorb torque and convert the brake force into electrical energy that may be stored by the energy storage device, as indicated by the bold lines and directional arrows. Since both the CISG and the ERAD convert brake force into energy which may be stored in the energy storage device, the third mode may provide the greatest energy storage device regenerative capabilities of the six operating modes. Accordingly, the third operating mode may be advantageously performed to improve energy recovery of the energy storage device. Furthermore, since both electric energy conversion devices are utilized to provide brake force in the third operating mode, the third operating mode may provide the greatest amount of brake force of the six operating modes. It will be appreciated that in the third operating mode, the engine may selectively provide engine compression braking by shifting the transmission in order to supplement the brake torque output of the CISG and the ERAD based on the desired brake force. Furthermore, in one example, the brake torque output of the CISG and engine compression braking may be increased while the ERAD brake torque output is decreased if a loss of traction on the rear wheels exists in order to maintain vehicle stability.

Figure 4D:
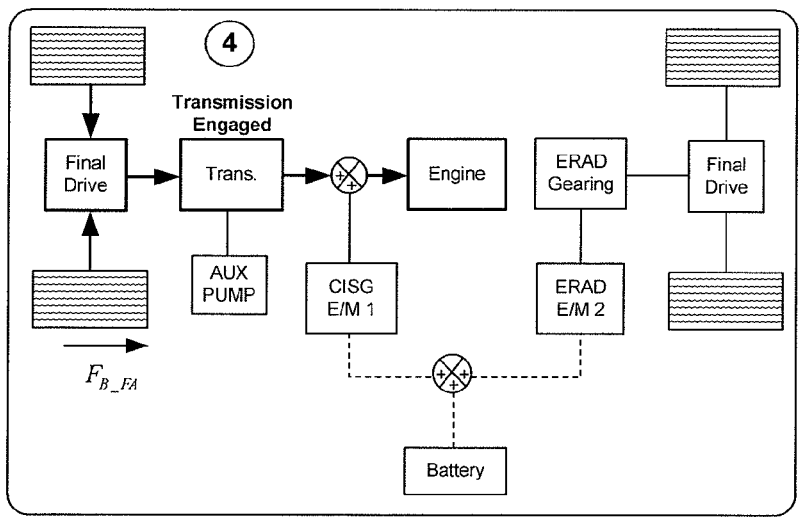

FIG. 4D shows a schematic depiction of an energy flow path of an example hybrid propulsion system performing a fourth operating mode that may be performed during a deceleration condition to achieve the requested driveline braking force. In the fourth mode, the engine may provide engine compression braking to achieve the requested driveline braking force. In particular, the transmission may be engaged and the engine may provide brake torque through the transmission to the front wheels to achieve the requested driveline braking force. In some cases, the state of the transmission may be adjusted to increase the amount of torque being transmitted to the wheels. For example, the transmission may be downshifted to a lower gear resulting in a higher gear ratio to transmit torque to the wheels. Further, in cases where the requested driveline brake force exceeds the brake torque capabilities of the engine, the friction brakes may be used to provide supplemental brake force. The fourth operating mode may be utilized when the CISG and the ERAD are unavailable due to operational limitations and/or vehicle stability conditions. Availability of the electric energy conversion devices to generate brake torque to achieve a requested driveline braking force with be discussed in further detail in FIG. 7.

Figure 4E:
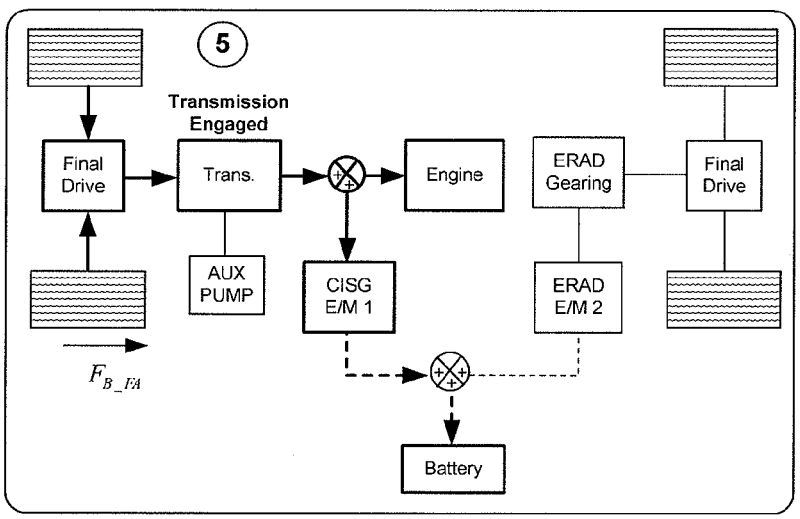

FIG. 4E shows a schematic depiction of an energy flow path of an example hybrid propulsion system performing a fifth operating mode that may be performed during a deceleration condition to achieve the requested driveline braking force. The fifth operating mode may include use of the CISG to achieve the requested driveline braking force. In the fifth operating mode, the CISG may absorb torque and convert the brake force into electrical energy that may be stored in the energy storage device, as indicated by the bold lines and directional arrows. The fifth mode may be selected when the ERAD is unavailable to provide brake torque output to decelerate the vehicle. In one example, the ERAD may be unavailable due to speed, temperature, or vehicle stability limitations. It will be appreciated that in the fifth operating mode, the engine may selectively provide engine compression braking by shifting the transmission in order to supplement the brake torque output of the CISG based on the desired brake force.

Figure 4F:
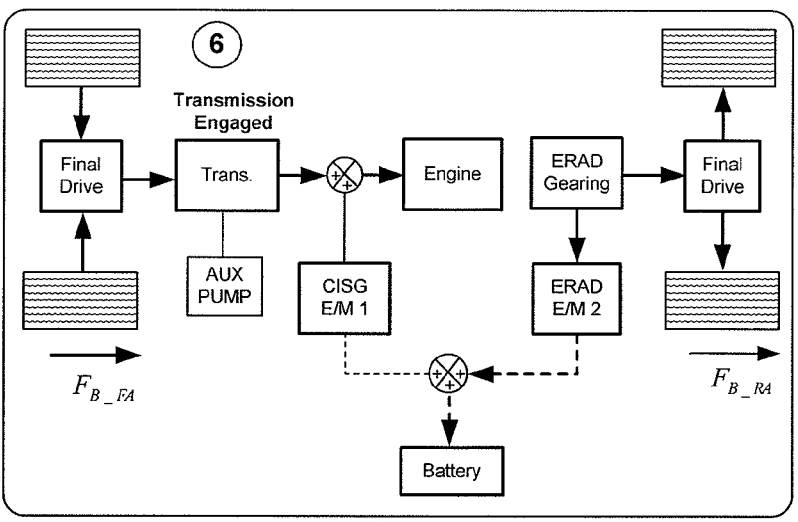

FIG. 4F shows a schematic depiction of an energy flow path of an example hybrid propulsion system performing a sixth operating mode that may be performed during a deceleration condition to achieve the requested driveline braking force. The sixth operating mode may include use of the engine and the ERAD to achieve the requested driveline braking force. In the sixth operating mode, the ERAD may absorb torque and convert the brake force into electrical energy that may be stored in the energy storage device, as indicated by the bold lines and directional arrows. The sixth mode may be selected when the CISG is unavailable to provide brake torque output to decelerate the vehicle. In one example, the CISG may be unavailable due to speed, temperature, or vehicle stability limitations. Further, the sixth mode may be selected when the driveline braking force is greater than the operational torque output limit of the ERAD and thus compression engine braking may be used to supplement the brake torque provided by the ERAD in order to meet the desired driveline braking force.

Figure 5:
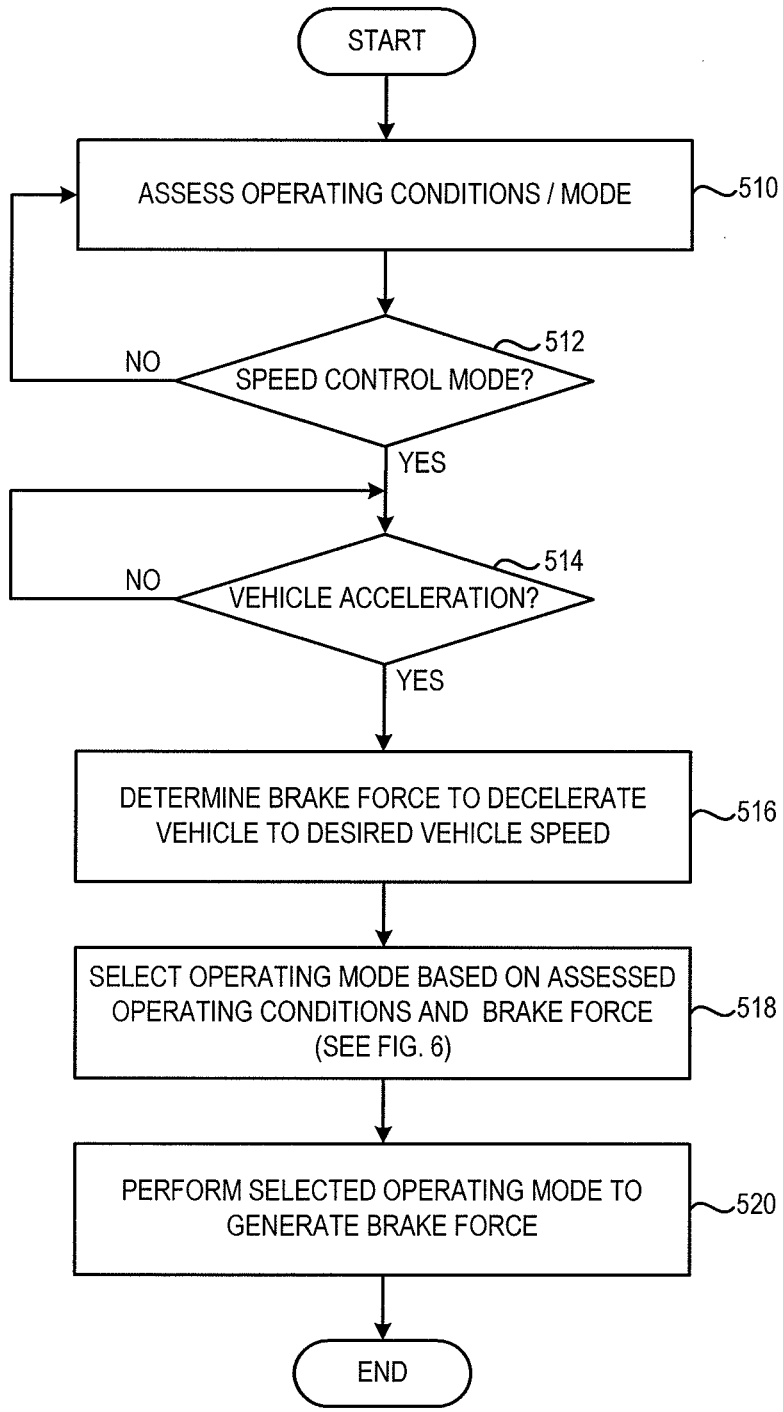
FIG. 5 shows a flowchart corresponding to a control routine for controlling torque output during a vehicle speed control operation to maintain a desired vehicle speed.

FIG. 5 is a flow chart depicting an example control strategy for controlling driveline braking of hybrid propulsion system 100 during vehicle speed control operation. In particular, the control strategy may be employed to provide brake torque in a smooth manner to the vehicle wheels in order to decelerate or maintain a current speed (or position) of the vehicle while taking into account vehicle stability and electrical energy conditions. The control strategy beings at 510, where operating conditions of the vehicle may be assessed, including current, past, and/or future operating conditions. As described herein, operating conditions may include, but are not limited to, one or more of the following: energy level or state of charge (SOC) of the energy storage device, energy exchange rate with the energy storage device, amount of torque exchanged between the drivelines and the ERAD and/or CISG, the position of a vehicle operator input device such as brake pedal, ambient conditions such as air temperature and pressure, angle of inclination or grade of the road surface, transmission state including selected gear and/or torque converter state, transmission turbine and output speeds, engine speed, vehicle speed, ERAD and CISG temperatures, among other operating states of the engine, CISG, ERAD, transmission, and energy storage device.

At 512, the control routine may include determining if vehicle speed control is being performed. Vehicle speed control operation may include closed loop control of the torque sources of the drivetrain in order to meet a desired vehicle speed with out active vehicle operator input via an input device such as a brake or accelerator pedal. In one particular example, vehicle speed control may be conducted during vehicle travel on an decline, such as a downhill descent, and selective driveline braking may be performed to maintain the desired speed of the vehicle with minimal or no use of the friction brakes. If it is determined that vehicle speed control is being performed the control routing moves to 514. Otherwise, the control routine moves to 512 again and polls for vehicle speed control operation.

At 514, the control routine may include detecting vehicle acceleration and more particularly unintended vehicle acceleration that is not commanded by the driver may be detected. In one example, vehicle acceleration that is not commanded may occur based on a declined road gradient which may cause the vehicle speed to increase. If it is determined that the vehicle is accelerating and the vehicle speed is greater than the desired vehicle speed the control routine moves to 516. Otherwise, the control routine moves to 514 again and polls for unintended vehicle acceleration.

At 516, the control routine may include determining a brake force to decelerate the vehicle to the desired vehicle speed. The brake force may be based on various operating conditions, for example, vehicle speed, road gradient, vehicle weight, etc. In some embodiments, the brake force may be determined via a lookup table stored in memory of the control system. Moreover, in some embodiments the brake force may be determined by utilizing adaptive learning based on previous vehicle deceleration events at the same operating conditions.

Next at 518, the control routine may include selecting an operating mode based on the assessed operating conditions and the determined brake force to decelerate the vehicle to the desired speed. For a given requested braking force, or a requested negative driveline torque, the control routine may apply a rule-based state machine scheme in order to increase and/or maximize energy recovery while achieving the requested driveline braking force. The operating mode may be selected from the six operating modes described above with reference to FIGS. 4A-4F. An operating mode may be selected based on the magnitude of driveline braking force requested, current SOC conditions and/or power exchange limitations of the energy storage device, among other limitations of the driveline components. Operating mode selection strategies will be discussed in further detail below with reference to FIG. 6. As one example, the operating mode may be selected by the control system in response to stored values. The control system may also utilize adaptive learning to select a suitable braking mode based on previous driveline braking response.

Next at 520, the operating mode selected at 518 may be performed to provide brake torque at the vehicle wheels in order to decelerate the vehicle to a desired vehicle speed. In this way, one or more sources of braking torque may be coordinated to smooth the driveline braking profile during vehicle speed control while providing increased energy recovery and considering the various limitations of the driveline components.

It will be appreciated that the above described control routine may be applied to speed control operations where a desired vehicle speed may be substantially zero. In one example, a vehicle may be positioned at a stop on an incline/decline and driveline brake force may be provided to prevent the vehicle from rolling upon a vehicle operator lifting their foot off of the brake pedal. In this example, vehicle acceleration maybe forecasted or expected and thus determination of vehicle deceleration may be based on a position of the brake pedal. Thus, a brake mode may be selected and performed to provide the brake force to maintain the vehicle in a stopped position. Further, the driveline may be adjusted to provide positive torque output in response to vehicle operator commanded acceleration such as via an accelerator pedal.

FIG. 6 shows a flow chart corresponding to an example control routine for selecting a suitable operating mode to provide driveline brake torque to decelerate a vehicle to a desired vehicle speed during vehicle speed control operations. The example control routine may take into consideration the magnitude of driveline braking force requested and electric energy conversion device availability based on current SOC conditions and/or power exchange limitations of the energy storage device, among other limitations or operating conditions of the driveline components. At 610, the control routine may include determining if a state of charge of the energy storage device is greater than a threshold limit. In one example, the threshold limit may be a maximum state of charge. In other words, since the energy storage device is substantially full of electric energy no more electric energy may be transferred to the energy storage device. Thus, regenerative braking may not be performed using the first electric energy conversion device and/or second electric energy conversion device without a charge balance between the two devices. If the SOC is greater than the threshold limit, the control routine moves to 612. Otherwise, if the SOC is less than the threshold limit and regenerative braking may be performed, the control routine moves to 618. It will be appreciated that the threshold limit of charge of the energy storage device may include other levels of charge. For example, the threshold limit may be eighty percent of the charge capacity of the energy storage device or another suitable percentage.

At 612, the control routine may include determining the availability (or capability) of the ERAD and the CISG to provide torque output (positive or negative) based on the operating conditions of the ERAD, CISG and vehicle. Although, the SOC of the energy store device may be substantially high, the ERAD and the CISG if available may be used in cooperation to generate brake torque output while generating a substantially neutral charge relative to the energy store device. In particular, the ERAD may absorb torque or generate brake torque to decelerate the vehicle which in turn may generate electric energy and the CISG may be disengaged from the transmission input and may generate positive torque to spin the engine at the same efficiency as the ERAD or another efficiency in order to create a substantially charge neutral state. Thus, if is determined that the ERAD and the CISG are available the control routine moves to 614 and the second operating mode (demonstrated in FIG. 4B) may be selected to generate brake torque to decelerate the vehicle to the desired speed. Otherwise it is determined that the ERAD and the CISG are not available and the control routine moves to 616 and the fourth operating mode (demonstrated in FIG. 4D) may be selected to generate the brake force to decelerate the vehicle to the desired speed. In the fourth operating mode, the internal combustion engine may provide engine compression brake torque to decelerate the vehicle and the electric energy conversion devices may generate substantially no brake torque. In particular, the state of the transmission may be adjusted to increase or decrease the amount of engine compression braking used to decelerate the vehicle. Availability of the electric energy conversion devices will be discussed in further detail with reference to FIG. 7.

At 618, the SOC of the energy storage device may be less than a threshold limit and the control routine may determine if the ERAD is available to provide driveline brake torque to decelerate the vehicle to the desired speed. If it is determined that the ERAD is available the control routine moves to 620. Otherwise, the ERAD is not available and the control routine moves to 630. Availability of the electric machines will be discussed in further detail with reference to FIG. 7.

At 620, the control routine may determine if the brake torque to decelerate the vehicle to the desired speed is less than an operational brake torque output limit of the ERAD. The operational brake torque output limit may be based on various operating conditions such as vehicle speed, temperature and other operating conditions discussed above with regard to the assessed operating conditions of FIG. 5. If the brake torque is less than the operational brake torque output limit of the ERAD the control routine moves to 622 and the first operating mode (demonstrated in FIG. 4A) may be selected. Operating mode one may adjust the torque output of the ERAD to generate brake torque to decelerate the vehicle to the desired speed. In the first operating mode, the ERAD may operate independent of the CISG and the engine and the CISG and the engine may output substantially no brake torque. If it is determined that the brake torque to decelerate the vehicle to the desired speed is greater than the operational brake torque output limit of the ERAD the control routine moves to 624.

At 624, the control routine may determine if the CISG is available to provide brake torque. If the CISG is available to provide brake torque the control routine moves to 626 and the third operating mode may be selected. In the third operating mode, the ERAD and the CISG may generate brake torque to decelerate the vehicle to the desired speed. In some cases where the requested brake torque is greater than the operational brake torque output limits of the ERAD and the CISG combined, the engine may be adjusted to provide engine compression braking. Further, in the third operating mode, the transmission may be engaged with the CISG so that torque generated by the CISG and/or the engine may be transmitted to the drive wheels. If it is determined that the CISG is not available to provide brake torque the control routine moves to 628 and the sixth operating mode may be selected. In the sixth operating mode, the ERAD may generate brake torque and the engine may generate engine compression brake torque in cooperation to decelerate the vehicle to the desired speed. In the sixth operating mode, the transmission may be engaged so that engine compression brake torque may be transmitted to the drive wheels.

Returning to 618, it has been determined that the SOC of the energy storage device is below a threshold limit and the electric energy conversion devices may perform regenerative braking to decelerate the vehicle to the desired speed. If it is determined that the ERAD is not available to generate brake torque to decelerate the vehicle to the desired speed the control routine moves to 630. At 630, the control routine may determine if the CISG is available to generate brake torque to decelerate the vehicle to the desired speed. If it is determined that the CISG is available to generate brake torque the control routine moves to 632 and the fifth operating mode may be selected. In the fifth operating mode, the CISG may generate brake torque to decelerate the vehicle to the desired speed. If the brake torque to decelerate the vehicle is greater than the operation brake torque output limit of the CISG the engine may generate engine compression brake torque in cooperation with CISG to decelerate the vehicle to a desired speed. In the sixth operating mode the transmission may be engaged and the brake torque generated by the CISG and/or the engine may be transmitted to the drive wheels. If it is determined that the CISG is not available to generate brake torque the control routine moves to 634.

At 634, the fourth operating mode may be selected. As discussed above in the fourth operating mode the engine may generate engine compression braking to decelerate the vehicle to the desired speed. In the fourth operating mode, the transmission may be engaged to transmit brake torque to the drive wheels. By selecting an operating mode to provide brake torque to decelerate the vehicle to the desired speed based on SOC of the energy storage and the availability and capability of the respective electric energy conversion devices, the hybrid propulsion system may be controlled to provide driveline braking to meet a requested brake force during a speed control operation of the vehicle in an efficient manner while maximizing the SOC of the energy storage device. In this way, braking may be provided in a smooth manner while reducing use of the friction brakes. Moreover, by using the electric energy conversion devices to provide brake torque the a state of the transmission may be shifted less frequently since engine compression braking may be used less frequently resulting in improved drivability during speed control operations of the vehicle.

Figure 7:
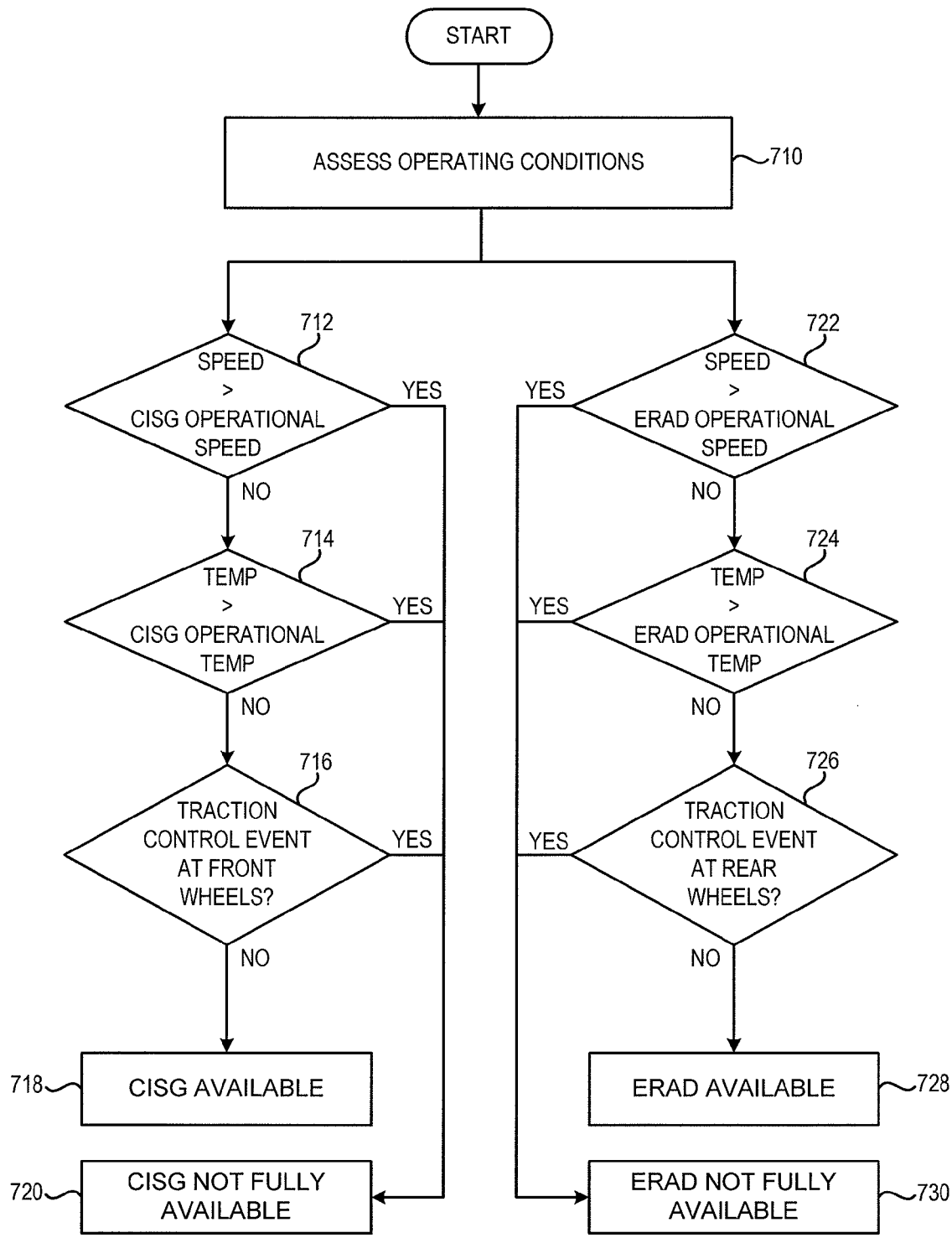
FIG. 7 shows a flowchart corresponding to a control routine for determining the availability of electric energy conversion devices of the hybrid propulsion system to provide brake torque during a vehicle speed control operation.

FIG. 7 shows a flow chart corresponding to an example control routine for assessing the availability of the electric energy conversion devices of the hybrid propulsion system to generate brake torque to decelerate the vehicle to a desired speed during vehicle speed control operations. The example control routine may take into consideration the vehicle speed, the engine speed, the operating temperatures of the electric energy conversion devices, vehicle stability conditions, and/or power exchange limitations, among other limitations of the driveline components. The control routine beings at 710, where operating conditions of the vehicle may be assessed, including current, past, and/or future operating conditions. As described above, operating conditions may include, but are not limited to, one or more of the following: energy level or state of charge (SOC) of the energy storage device, energy exchange rate with the energy storage device, amount of torque exchanged between the drivelines and the ERAD and/or CISG, the position of a vehicle operator input device such as brake pedal, ambient conditions such as air temperature and pressure, angle of inclination or grade of the road surface, transmission state including selected gear and/or torque converter state, transmission turbine and output speeds, engine speed, vehicle speed, among other operating states of the engine, CISG, ERAD, transmission, and energy storage device.

At 712, the control routine may determine if the vehicle speed is greater than the operational speed limit of the CISG. Under some conditions, the engine speed may dictate the operational speed limit of the CISG. If it is determined that the vehicle (or engine) speed is greater than the operational speed limit of the CISG, the control routine determines that the CISG is not fully available to provide brake torque to decelerate the vehicle at 720. Otherwise, the control routine moves to 714.

At 714, the control routine may determine if the temperature of the CISG is greater than an operational temperature limit of the CISG. If it is determined that the temperature of the CISG is greater than the operational temperature limit of the CISG the control routine determines that the CISG is not fully available to provide brake torque to decelerate the vehicle at 720. Otherwise, the control routine moves to 716.

At 716, the control routine may determine if a traction control event is occurring at the drive wheels to which the CISG may provide brake torque. In the configuration illustrated in FIG. 1, the drive wheels to which the CISG may provide brake torque are the front wheels. In one example, a traction control event may include slippage of the drive wheels. If it is determined that a traction control event is occurring at the drive wheels to which the CISG may provide brake torque the control routine determines that the CISG is not fully availably to provide brake torque to decelerate the vehicle at 720. Otherwise, if it is determined that a traction control event is not occurring at the drive wheels to which the CISG may provide brake torque the control routine moves to 718 and it is determined that the CISG is available and/or capable of generating brake torque to decelerate the vehicle.

At 722, the control routine may determine if the vehicle speed is greater than the operational speed limit of the ERAD. If it is determined that the vehicle speed is greater than the operational speed limit of the ERAD the control routine determines that the ERAD is not fully available to provide brake torque to decelerate the vehicle at 730. Otherwise, the control routine moves to 724.

At 724, the control routine may determine if the temperature of the CISG is greater than an operational temperature limit of the ERAD. If it is determined that the temperature of the ERAD is greater than the operational temperature limit of the ERAD the control routine determines that the ERAD is not fully available to provide brake torque to decelerate the vehicle at 730. Otherwise, the control routine moves to 726.

At 726, the control routine may determine if a traction control event is occurring at the drive wheels to which the ERAD may provide brake torque. In the configuration illustrated in FIG. 1, the drive wheels to which the ERAD may provide brake torque are the rear wheels. In one example, a traction control event may include slippage of the drive wheels. If it is determined that a traction control event is occurring at the drive wheels to which the ERAD may provide brake torque, the control routine determines that the ERAD is not fully availably to provide brake torque to decelerate the vehicle at 730. Otherwise, if it is determined that a traction control event is not occurring at the drive wheels to which the ERAD may provide brake torque the control routine moves to 728 and it is determined that the ERAD is available and/or capable of generating brake torque to decelerate the vehicle.

Not that if it is determine that the CISG and/or the ERAD are not fully available to provide brake torque to decelerate the vehicle, the CISG and/or the ERAD may provide some or no brake torque to decelerate the vehicle. Furthermore, brake torque generated by the CISG and/or the ERAD may by transmitted to one or more drive wheels and brake torque may be transmitted to specific drive wheels based on the occurrence of a traction control event. By determining the availability or capability of the electric energy conversion devices, a suitable operating mode may be selected to provide driveline brake torque in a smooth manner. In this way, vehicle braking may be performed across a range of vehicle operating conditions in a manner which maximizes the SOC of the energy storage device and extends the life of the friction brakes Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the vehicle control system. It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a hybrid propulsion system for a vehicle including a first electric energy conversion device for exchanging torque through a transmission device, the transmission device exchanging torque with a first at least one drive wheel, the hybrid propulsion system having a second electric energy conversion device for exchanging torque with a second at least one drive wheel, operation of the first electric energy conversion device, the transmission device, and the second electric energy conversion device controlled by a control system, the method comprising:

during a vehicle cruise control operation of the vehicle to maintain vehicle speed of the vehicle at a desired speed, in response to vehicle acceleration of the vehicle resulting in vehicle speed of the vehicle beyond the desired speed, the vehicle acceleration of the vehicle not caused by vehicle operator input of the vehicle, varying torque output of at least one of the first electric energy conversion device and the second electric energy conversion device to provide brake torque to at least one of the first at least one drive wheel and the second at least one drive wheel to decelerate the vehicle to the desired speed, where selection of said one of the first and second electric energy conversion device is based on an operating condition of the vehicle.

2. The method of claim 1, wherein the operating condition includes slippage of the second at least one drive wheel, and the method includes varying the torque output of the first electric energy conversion device to provide at least some brake torque at the first at least one drive wheel to decelerate the vehicle to the desired speed based on the slippage of the second at least one drive wheel.

3. The method of claim 1, wherein the operating condition includes slippage of the first at least one drive wheel, and the method includes varying the torque output of the second electric energy conversion device to provide at least some brake torque at the second at least one drive wheel to decelerate the vehicle to the desired speed based on the slippage of the first at least on drive wheel.

4. The method of claim 1, wherein the hybrid propulsion system further includes an energy storage device in electrical communication with the first electric energy conversion device and the second electric energy conversion device and the operating condition includes a state of charge of the energy storage device, the method further comprising in response to the state of charge of the energy storage device being beyond a threshold limit, adjusting the second electric energy conversion device to provide brake torque to decelerate the vehicle to the desired speed, disengaging the transmission device from the first electric energy conversion device, and adjusting the first electric energy conversion device to provide torque output such that a balance of charge between operation of the first electric energy conversion device and the second electric energy conversion device is substantially neutral.

5. The method of claim 4, wherein the hybrid propulsion system further includes an internal combustion engine to provide torque to an input of the transmission device, the transmission device is a multiple step fixed-gear ratio transmission device, and the operating condition includes a speed of the first and the second electric energy conversion devices and a temperature of the first and the second electric energy conversion devices, the method further comprising in response to a state of charge of the energy storage device being beyond a threshold limit and at least one of the vehicle speed of the vehicle being beyond an operational speed limit of at least one of the first electric energy conversion device and the second electric energy conversion device, and a temperature of the first or second electric energy conversion device being beyond an operational temperature limit of at least one of the first electric energy conversion device and the second electric energy conversion device, adjusting the internal combustion engine to provide at least some engine compression brake torque to decelerate the vehicle to the desired speed.

6. The system of claim 5, wherein the method further comprises adjusting a state of the multiple step fixed-gear ratio transmission device to adjust an amount of brake torque transmitted to the first at least one drive wheel based on the state of charge of the energy storage device.

7. The method of claim 5, wherein the hybrid propulsion system is an all wheel drive configuration, and the internal combustion engine and the first electric energy conversion device provide torque to a front drive wheel and the second electric energy conversion device provides torque to a rear drive wheel.

8. The method of claim 1, further comprising maintaining the vehicle speed of the vehicle at substantially zero during a vehicle speed control operation of the vehicle, and varying the torque output of at least one of the first electric energy conversion device and the second electric energy conversion device to provide brake torque to at least one of the first at least one drive wheel and the second at least one drive wheel to maintain the vehicle speed of the vehicle at zero until operator commanded acceleration of the vehicle.

9. A method of controlling a hybrid propulsion system for a vehicle including a first electric energy conversion device for exchanging torque through a transmission device, an internal combustion engine also for exchanging torque through the transmission device, the transmission device exchanging torque with a first drive wheel, the hybrid propulsion system having a second electric energy conversion device for exchanging torque with a second drive wheel, the hybrid propulsion system further including an electrical energy storage device coupled to the first electric energy conversion device and the second electric energy conversion device, operation of the first electric energy conversion device, the internal combustion engine, the transmission device, and the second electric energy conversion device controlled by a control system configured to carry out the method, the method comprising:

in response to vehicle acceleration of the vehicle resulting in a vehicle speed of the vehicle being beyond a desired vehicle speed of the vehicle during a cruise control operation, the vehicle acceleration of the vehicle not caused by vehicle operator input of the vehicle, providing brake torque output to decelerate the vehicle to maintain the desired speed and maintain an operating condition within operational limits by selection of a mode from a first mode, a second mode, a third mode, a fourth mode, a fifth mode, and a sixth mode at different operating conditions of the vehicle, wherein the first mode comprises providing brake torque from the second electric energy conversion device, the second mode comprises providing brake torque from the first electric energy conversion device, the third mode comprises providing brake torque from the first electric energy conversion device and the second electric energy conversion device, the fourth mode comprises providing brake torque from the internal combustion engine, the fifth mode comprises providing brake torque from the internal combustion engine and the first electric energy conversion device, and the sixth mode comprises providing brake torque from the internal combustion engine and the second electric energy conversion device, the operating condition including one or more of the vehicle speed of the vehicle, the desired vehicle speed of the vehicle, a state of charge of the electrical energy storage device, a speed of at least one of the first and second electric energy conversion devices, a temperature of at least one of the first and second electric energy conversion devices, an occurrence of a traction control event in at least one of the first drive wheel and the second drive wheel, and a total requested brake torque.

10. The method of claim 9, wherein the first mode is selected to provide brake torque to decelerate the vehicle to the desired speed based on the operating condition of the vehicle including the vehicle speed of the vehicle being greater than the desired speed, the state of charge of the electrical energy storage device being less than a maximum state of charge of the electrical energy storage device, and at least one of the temperature of the first electric energy conversion device being greater than a threshold operating temperature and the speed of the first electric energy conversion device being greater than a threshold operating speed.

11. The method of claim 9, wherein the third mode is selected to provide brake torque to decelerate the vehicle to the desired speed based on the operating condition of the vehicle including the vehicle speed of the vehicle being greater than the desired speed, the state of charge of the electrical energy storage device being less than a maximum state of charge of the electrical energy storage device, and the total requested torque being greater than a maximum torque that can be provided by the second electric energy conversion device, the maximum torque varying with vehicle speed of the vehicle.

12. The method of claim 9, wherein the fourth mode is selected to provide brake torque to decelerate the vehicle to the desired speed based on the operating condition of the vehicle including the vehicle speed of the vehicle being greater than the desired speed, the state of charge of the electrical energy storage device being greater than a maximum state of charge of the electrical energy storage device, at least one of the temperature of the first electric energy conversion device being greater than a threshold operating temperature and the speed of the first electric energy conversion device being greater than a threshold operating speed, and at least one of the temperature of the second electric energy conversion device being greater than a threshold operating temperature and the speed of the second electric energy conversion device being greater than a threshold operating speed.

13. The method of claim 9, wherein the fifth mode is selected to provide brake torque to decelerate the vehicle to the desired speed based on the operating condition of the vehicle including the vehicle speed of the vehicle being greater than the desired speed, the state of charge of the electrical energy storage device being less than a maximum state of charge of the electrical energy storage device, and at least one of the temperature of the second electric energy conversion device being greater than a threshold operating temperature and the speed of the second electric energy conversion device being greater than a threshold operating speed.

14. The method of claim 9, wherein the sixth mode is selected to provide brake torque to decelerate the vehicle to the desired speed based on the current operating condition of the vehicle including the vehicle speed of the vehicle being greater than the desired speed, the state of charge of the electric energy storage device being less than a maximum state of charge of the electric energy storage device, the total requested torque is greater than a maximum torque that can be provided by the second electric energy conversion device, the maximum torque varying with vehicle speed of the vehicle, and at least one of the temperature of the first electric energy conversion device being greater than a threshold operating temperature and the speed of the first electric energy conversion device being greater than a threshold operating speed.

* * * * *